(12) United States Patent
Priller et al.

(10) Patent No.: US 8,463,518 B2
(45) Date of Patent: Jun. 11, 2013

(54) SAFE DETERMINATION OF CONTACT POINT

(75) Inventors: Heiko Priller, Karlsruhe (DE); Andreas Maxon, Karlsruhe (DE); Juergen Eich, Buehl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 348 days.

(21) Appl. No.: 12/774,014

(22) Filed: May 5, 2010

(65) Prior Publication Data

US 2010/0286863 A1  Nov. 11, 2010

(30) Foreign Application Priority Data

May 5, 2009  (DE) .......................... 10 2009 020 017

(51) Int. Cl.
*G06F 7/00*  (2006.01)

(52) U.S. Cl.
USPC ............................................. 701/67; 701/68

(58) Field of Classification Search
USPC ..................................................... 701/67–68
See application file for complete search history.

(56) References Cited

U.S. PATENT DOCUMENTS

| 2008/0227593 | A1* | 9/2008 | Bartels et al. .................. 477/39 |
| 2008/0277229 | A1* | 11/2008 | Wallner et al. ................ 192/54.1 |
| 2009/0131217 | A1* | 5/2009 | Jager et al. ..................... 477/80 |
| 2009/0281700 | A1* | 11/2009 | Petzold et al. ................ 701/68 |

\* cited by examiner

*Primary Examiner* — Hussein A. Elchanti
(74) *Attorney, Agent, or Firm* — Lucas & Mercanti, LLP

(57) ABSTRACT

Implementation of a safety function that secures the value of the contact point, which is important for twin clutch systems, against wrong determination. It is part of a safety system that ensures functional safety for twin clutch systems.

24 Claims, 2 Drawing Sheets

SAFE DETERMINATION OF CONTACT POINT

BACKGROUND OF THE INVENTION

The invention relates to a process for determining and monitoring a contact point of an automated clutch in a motor vehicle. The invention also relates to a computer program product and apparatus for determining and monitoring the contact point of an automated clutch.

The DE 102 48 195 A1 discloses a process for monitoring a function of a motor vehicle control unit.

The application area of the invention is the control of twin clutch systems and related automated clutch systems in automobiles. The invention is a safety function and serves as a component part of a safety system for guaranteeing functional safety of twin clutch systems and related, automated clutch systems.

In principle, safety functions are designed such that so long as no error is indicated by the safety function, no error prevails in the process carried out and/or monitored by the safety function and system with which the process is carried out because all actions or reactions of the system are considered with respect to the process.

In modern motor vehicles, automated clutches, i.e. clutches operated by actuators, are increasingly finding application. The position of an activating element of the clutch or actuator respectively is mostly recorded with the help of an incremental counter that directly delivers only the information regarding the regulated distance just covered; however, it does not deliver information about the absolute position of the activating element. In order to find the absolute position, referencing is required whereby a predetermined activating position of the clutch is approached by the actuator and the respective count of the incremental counter is read out.

The same problem is posed by actuators with an absolute distance measurement and is not necessarily coupled to the incremental distance measurement.

A fundamental problem of such incremental distance measurements is their dependence upon exact determination of the reference position. This problem is aggravated in that for vehicle operation, the occurrence of error events must be inherently expected, which can lead to the absolute position of the clutch actuator or respectively of the activation element of the clutch not being known and thus also the clutch torque setting by the actuator in the electronic control device is no longer known. Critical events relating to safety can result from this, for instance, the vehicle starting to move without the driver's intent. An exact knowledge of the respective activation position of the clutch in a twin clutch transmission is particularly critical to safety in which two clutches must be actuated in an accurately coordinated manner.

For the control of automated clutch systems, for instance, automated manual-shift transmissions with a single clutch or twin clutch systems, the so-called contact point is a central quantity. It describes the position of a clutch, from where the latter begins to transmit a definite, low torque—normally about 5 Nm is selected. Among others, this position is therefore important in ensuring functional safety.

The contact point is learned during the first start up operation by each of the two clutch systems in the twin clutch system and stored in the system. This one-time learning would neither fulfill the comfort nor the safety requirements for the system, since the contact point, due to the system and ambient conditions can already fluctuate within a driving cycle and changes also in the long term over the lifespan of the system. For this reason, there are complex adaptation and compensation strategics in the control software of twin clutch systems, which have the target of determining the current contact point as accurately as possible.

If these strategies would lead to incorrect determination of the contact point, this can, in the worst case, lead to safety critical situations. The clutch would transmit different torque at the contact point than what is expected. The functional safety for the twin clutch system would be in question.

SUMMARY OF THE INVENTION

Pursuant to the invention, a process is provided for determining and monitoring a contact point of an automated clutch in a motor vehicle, wherein the motor vehicle features a control device. The process includes the steps of determining the contact point by means of an adaptation strategy that is executed as a non-safety function, and executing a monitoring process of the determined contact point using a monitoring module as a safety function. The safety function of the determined contact point is at ready disposal, and determines at least one band depending upon initially determined contact points and/or a default time scale and/or a default tolerance and detects a non-plausible state of the clutch when the determined contact point lies outside of the band.

A possible approach to avoiding such incorrect determination would be to implement the entire complex adaptation and compensation strategies—with the related, increased requirements in development, testing, and documentation—as a safety function within the scope of a safety system. Complexity and safety are competing system properties and this alone speaks—besides the costs owing to the complexity—against this approach.

This approach is only mentioned as a matter of completeness.

The invention describes an alternative approach: Incorrect determinations of the contact point are reduced, with the help of an additional, simple, and cost effective safety function, to a reasonable number and hence the functional safety of twin clutch systems is ensured in this respect.

The process according to the invention provides for the determining and monitoring a contact point of a clutch that is disposed between the engine and transmission of a vehicle. The vehicle features a control device, wherein the contact point is determined by means of an adaptation strategy executed as a non-safety function (220). Monitoring of the determined contact point (230) takes place with the help of a monitoring module that is executed as a safety function (250), wherein the safety function (250) of the determined contact point (230) is available, and at least one band (120, 130) is determined in dependence upon contact points determined initially and/or a default time scale and/or a default tolerance. It is identified on a non-plausible state of the clutch when the determined contact point lies outside of at least one band.

A band is determined in such a manner that a time mean value is determined from the period directly before the determined contact points and values that, in terms of magnitude, deviate from the mean value by less than default tolerance are evaluated as though they belong to the band.

A short-term band is preferably determined with a default period of 5 seconds.

A mid-term band is determined preferably with a default period of 1 minute.

A long-term band is preferably determined with a default period of 1 hour.

As tolerance, a value between 0.01 millimeters to 10 millimeters, preferably 0.1 millimeters to 5 millimeters is issued by default.

The value for the tolerance is advantageously dependent upon the design of the clutch.

The value for the tolerance is advantageously specified in dependence upon a default period.

The mean value is determined as an arithmetic mean of the contact points determined during the initial default time period.

Alternatively, the mean value is determined as a weighted mean of the contact points determined immediately previously during the default time period, wherein the values for the contact point lying chronologically further back are weighted more weakly than the current values for the contact point that are chronologically close.

Alternatively, the mean value is determined as a weighted mean of the contact points during the initial time period, wherein the values for the contact point chronologically earlier are weighted more weakly than the current values for the contact point chronologically recent.

The weighting falls off linearly. Alternatively, the weighting falls of exponentially.

Alternatively, the mean value is recursive, for instance, calculated in a filter algorithm, in order to keep the memory and calculation requirements low in the clutch or transmission control.

Pursuant to a further alternative, the mean value during a driving cycle is kept constant at a last stored plausible contact point.

The mean value is preferably readjusted to the current contact point only with a maximum value based on the magnitude.

The monitoring module with the safety function (250) detects a non-plausible state of the clutch, when the rate of change of the contact point exceeds a limit velocity value.

Also, a computer program product with a computer program is proposed, which features software means for executing the above-mentioned process when the computer program is executed on a computer. Such a computer can be part of the control device.

According to the invention, an apparatus for determining and monitoring a contact point of a clutch disposed between an engine and a transmission of a motor vehicle is also proposed. The apparatus also features a control device, wherein the control device is provided so that the contact point can be determined by means of an adaptation strategy, which is executed as a non-safety function (220). The monitoring process of the determined contact point (230) occurs with the help of a monitoring module that is executed as a safety function (250). The control device is also provided so that the safety function (250) of the determined contact point (230) is at the ready and at least one band (120, 130) can be determined in dependence upon initially determined contact points and/or of a default time scale and/or a default tolerance. The safety function (250) detects a non-plausible state of the clutch when the determined contact point lies outside at least one band.

Further advantages and advantageous embodiments of the invention are shown in the following figures and detailed description.

DETAILED DESCRIPTION OF THE INVENTION

Figure 1:
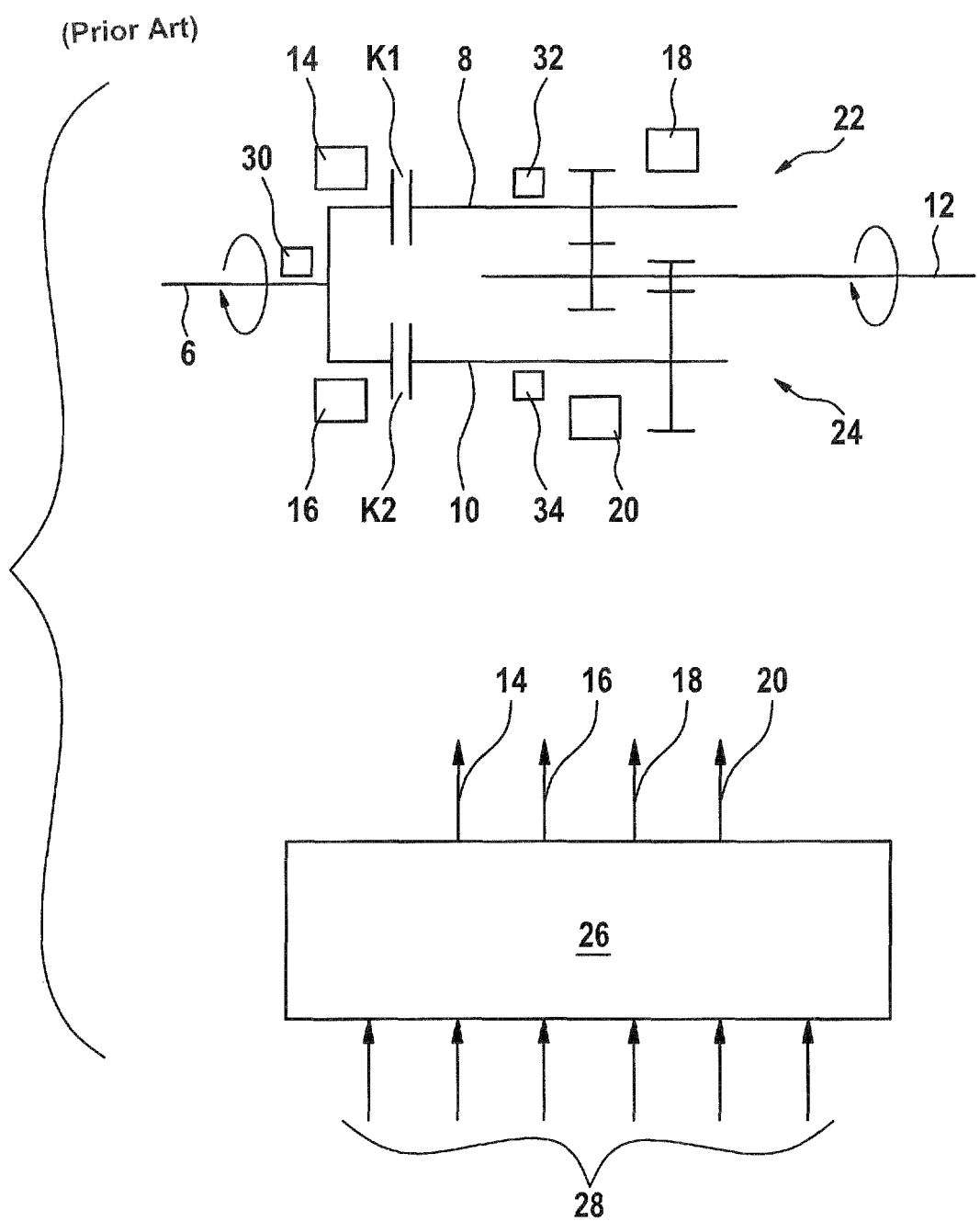
FIG. 1 shows a block diagram of a known twin clutch transmission with a corresponding electronic control device.

FIG. 1 shows a known twin clutch- or parallel shift transmission with a drive shaft 6, for instance driven by an internal combustion engine, that is selectively non-rotatably connectable with two input shafts 8 and 10. The torque flow from the drive shaft 6 into the input shafts 8 and 10 is controllable via each clutch K1 and K2, selectively. Between the input shaft 8 and an output shaft 12, different transmission ratios are selectable via wheel pairs of which only one is depicted. Likewise, different wheel pairs are selectable between the input shaft 10 and the output shaft 12, of which only one is depicted. Actuators 14 and 16 are provided for actuating the clutches K1 and K2. Actuators 18 and 20 are provided, which each include a shifting actuator and a selecting actuator, for switching the wheel pairs, for establishing a non-rotatable connection between the wheel disposed on the input shaft 8 or 10 with the respective input shaft 8 or 10 that meshes constantly with a respective wheel connected non-rotatable with the output shaft 12. The input shaft 8 and the output shaft 12 as well as the input shaft 10 and the output shaft 12 together each form a partial transmission 22 or 24 of the twin clutch transmission respectively.

For the activation of the actuators 14, 16, 18 and 20, an electronic control device 26 with a microprocessor and associated program- and data memories is used, whose outputs activate one of the actuators and whose inputs 28 are connected with sensors 30, 32 or respectively 34, which determine the speed of the drive shaft 6, of the input shaft 8 and of the input shaft 10, as well as further sensors for acquiring operating parameters of the vehicle drive train, for instance a sensor for acquiring the speed of driven vehicle wheels, a sensor for acquiring the position of a transmission selector lever, a sensor for acquiring the position of an accelerator, etc. The depicted control device 26 can be connected via a bus system with other control devices of the vehicle, for instance an engine control device with which a power control element of the engine is controlled. The actuators, for example, can be formed as lever actuators which are activated, for example, by means of electric motors, wherein the rotation of each electric motor is determined by an incremental counter (not depicted).

The torque respectively transmittable by the clutch is important for the functioning of a clutch and is stored as a curve in a memory of the control device 26, said curve reproduces the transmittable clutch torque in dependence upon the position of a clutch actuator, for instance, a clutch lever. In case of a change of the function state of the clutch through wear and the like, the characteristic curve must be updated; this occurs through an adaptation process, for instance, through which the contact point of the clutch is checked during operation and any changes of clutch properties must be adjusted.

With the twin clutch transmission depicted in FIG. 1, in the respective partial transmission 22 or 24, by which the clutch is open, a gear can be selected, whereas the effective transmission ratio of the transmission is determined by the current (active) partial transmission, by which the clutch is closed. When a gear is selected and the clutch K1 is closed in partial transmission 22, for instance, then this gear will be active for the transmission between the drive shaft 6 and output shaft 12. At the same time, in the other partial transmission 24, a new gear to be selected can be engaged. When shifting the transmission, from the currently engaged gear into the newly selected gear, the clutch K1 must be opened and for gearrattle-free connection between the drive shaft 6 and the output shaft 12, the clutch K2 must be closed in an overlapping manner. When the clutch K2 assumes torque transmission, the transmission would be destroyed if at least one of the clutches K1, K2 does not simultaneously slip. Therefore, at least temporarily, a slipping state will be established, whereby at least one of the two clutches K1, K2 slips when both clutches K1, K2 are closed beyond their contact point, wherein a contact point is defined as the point after which the clutch transmits torque as the closure increases (at the contact point, torque of at least a few Newton meters will be transmitted).

Figure 2:
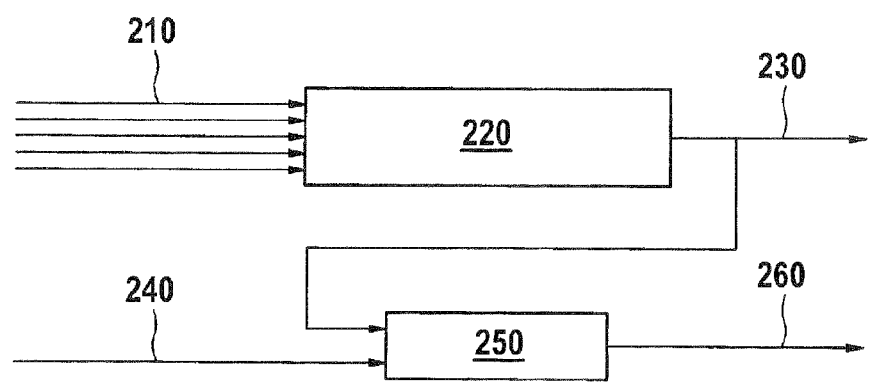
FIG. 2 shows a process according to the invention.

The solution approach according to the invention is as follows:

Common, complex adaptation strategies for determining the contact point are used, which are already known as processes according to the state of the art. In the approach according to the invention, depicted in FIG. 2, the strategies are not implemented as a safety function, so that the requirements for their creation is small. In addition, a monitoring module with safety function 250 for determining the safe contact point 260 is implemented. This safety function 250 reads in the contact point 230 that has been determined as an output signal by the complex adaptation strategy of the non-safety function 220 and checks its chronological change for plausibility.

Figure 3:
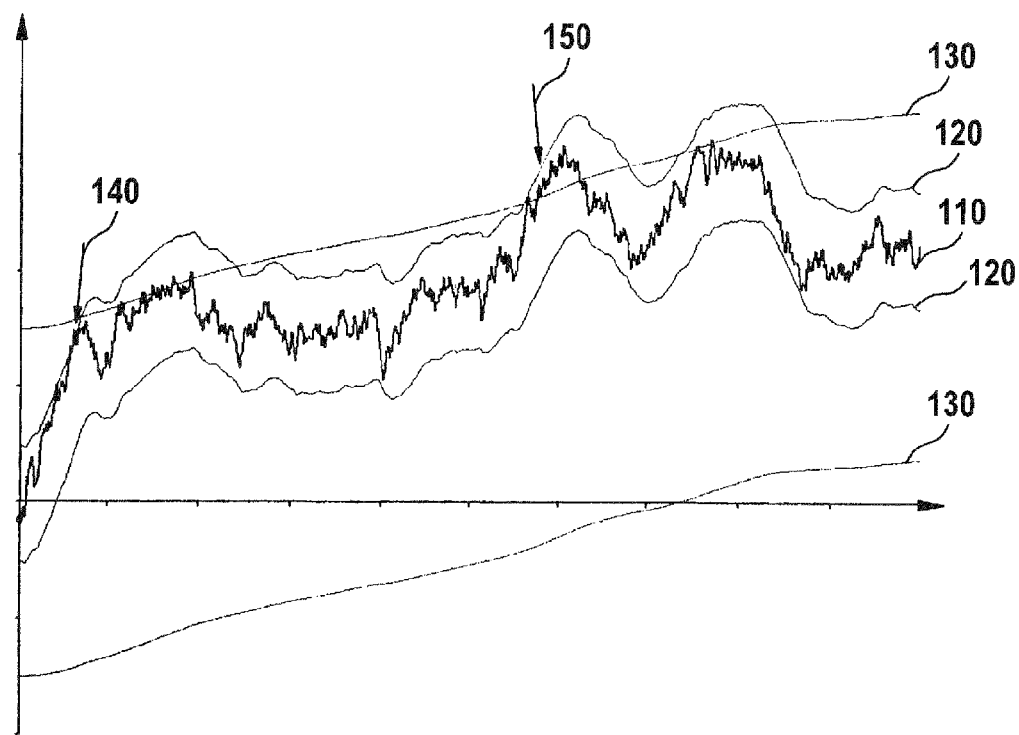
FIG. 3 shows an example of the process according to the invention.

The safety function 250 additionally calculates one or more bands 120,130—depicted in FIG. 3—in which the contact point 110 may change and its change is classified as plausible. These bands feature various time scales—for instance, short-term 120, mid-term, long-term 130—and can have various tolerances—for instance +/−0.2 mm or +/−1 mm.

The widths of the bands 120, 130 are oriented towards the design of the clutch and are based on many years of experience. These reflect how the contact point can change due to different system properties and ambient conditions on the respective time scale—for example, short-term 120, mid- or long-term 130. To guarantee functional safety, it is essential that the maximum rate of change of the contact point, which results from these considerations, does not exceed a certain measured value. It may only be so large that a wrong adaptation of the contact point with this speed can be mastered by the driver. All rapid changes of the contact point are classified by the safety function as erroneous.

First, the time-based mean value of the contact point is determined by the safety function 250. This can occur in different ways. Characteristic for this is the default period—beginning from the time point when the current contact point was determined—through which one determines the mean value over all values initially determined for the contact point within the period. The current contact point, in the process, can be alternatively incorporated by averaging, or can comprise only the values determined earlier for the contact point within the default time period. Within this application, the period is also designated as a time scale.

For example, the last 5 seconds are prescribed as a short-term time scale or the last 1 minute as a mid-term time scale or the last 1 hour as a long-term time scale. Other values can also be used.

From this mean value of the contact points, which is assigned to the current contact point, a tolerance is specified about the mean value in both directions, from which the width of the band is obtained. As tolerance, for instance, plus/minus 0.2 millimeters or plus/minus 1 millimeter or plus/minus 3 millimeters or other values are chosen. The magnitude of the default tolerance is oriented towards the corresponding time scale as well as at the design type of the clutch and is based on many years of experience.

This is repeated for every new and current contact point, so that one band is obtained.

If the current contact point exceeds the tolerance for the calculated mean value, the contact point will no longer be evaluated as plausible.

For the determination of the mean value of the contact point within a certain time scale, there are various possibilities available.

Using an example of a time scale of one second, the mean value is determined as arithmetic mean of the initially determined contact points of the last second. In the case of a system with 10 milliseconds of timing pulse frequency, the mean value is determined as arithmetic mean of the last 100 values of the contact point.

Alternatively, a weighted mean of contact points is determined by which the earlier contact points are weighted more weakly than the recent contact points.

Such weighting can fall off exponentially.

Alternatively, the weighting can be selected to fall off linearly.

The calculation of the mean value can also take place according to other computation rules, particularly recursive algorithms like digital filters.

Alternatively, a maximum difference—based on magnitude—between two directly successively determined mean values is additionally provided. If the difference between the newly determined mean value and the initially directly determined mean values exceeds a default limit value, the new mean value from the initially determined mean values will be calculated and added with the limit value so that the new calculated mean value will be greater by the magnitude of limit values than the initially determined mean value. If the difference between the newly determined mean value and the initially determined mean values falls short of a default negative limit value, the new mean value from the initially determined mean values will be added with the negative limit value, so that the new calculated mean value is smaller, by the magnitude of the negative limit values, than the initially determined mean value. Thus, the mean value will be adjusted to the current contact point only with a maximum gradient based on the magnitude.

If the contact point runs out of one of the plausible bands 120,130, this will be classified, by the monitoring module with the safety function 250, as an error in the complex adaptation strategy. In this case, monitoring with a short-term band 120 is above all suitable for detecting singular errors—such as calculation errors. The long-term band 130 in contrast can trace impermissible drift movements. With both monitoring instances, the safety function 250 triggers an error reaction. This brings the twin clutch system into a safe state, for instance, by opening both clutches.

A possible example is depicted in FIG. 3, which shows the change of the contact point 110 over time. In this case there are two plausible bands, a short-term 120 and a long-term 130. In FIG. 3 several errors of the adaptation strategy 220 are visible; two of which are marked by arrows 140,150. In the first case, the short-term band is violated and a short-term error 140 is present, in the second case, also in the long-term band is violated and a long-term error 150 is present. In both cases, the safety function 250 would trigger error reaction and bring the twin clutch system into a safe state.

The invention describes a simple and cost-effective implementation of a safety function, which secures the "contact point" variable that is important for twin clutch systems against wrong determination. It is part of a safety system that ensures functional safety for twin clutch systems.

LIST OF REFERENCE SYMBOLS 6 drive shaft
8 input shaft
10 input shaft
12 output shaft
14 actuator
16 actuator
18 actuator
20 actuator
22 partial transmission
24 partial transmission
26 control device
28 inputs
30 sensor
32 sensor
34 sensor
K1 clutch
K2 clutch
110 tracing point
120 short-feint band
130 long-term band
140 short-term error
150 long-term error
210 input signals
220 complex adaptation strategy of the tracing point as non-safety function
230 tracing point
240 input signals
250 monitoring module with safety function
260 safe tracing point

What we claim is:

1. A process for determining and monitoring a contact point of an automated clutch in a motor vehicle, wherein the motor vehicle features a control device, the process comprising the steps of:
    determining, by the control device, the contact point by means of an adaptation strategy that is executed as a non-safety function, the control point describing a position of the clutch from where the clutch begins to transmit a definite torque; and
    executing a monitoring process of the determined contact point using a monitoring module as a safety function, wherein the safety function of the determined contact point is at ready disposal, and the safety function of the monitoring module determines at least one band defining range of values for the contact point, the at least one band depending upon one of initially determined contact points, a default time scale, and a default tolerance and detects a non-plausible state of the clutch when the determined contact point lies outside of the at least one band.

2. The process according to claim 1, wherein a band is determined such that a time mean value is determined from the initially determined contact points during a pre-determined time period and values that, based on magnitude, deviate from the mean value by less than a pre-determined tolerance are evaluated as belonging to the band.

3. The process according to claim 2, including determining a short-term band with a default period of 5 seconds.

4. The process according to claim 2, including determining a mid-term band with a default period of 1 minute.

5. The process according to claim 2, including determining a long-term band with a default period of 1 hour.

6. The process according to claim 2, including setting a tolerance value between 0.01 millimeters to 10 millimeters.

7. The process according to claim 6, including setting the tolerance value between 0.1 millimeters to 5 millimeters.

8. The process according to claim 6, including setting the value for the tolerance in dependence upon design of the clutch.

9. The process according to claim 6, including setting the value for the tolerance in dependence upon the pre-determined period.

10. The process according to claim 8, including setting the value for the tolerance in dependence upon the predetermined period.

11. The process according to claim 2, including determining the mean value as an arithmetic mean of the contact points determined immediately prior during the pre-determined time period.

12. The process according to claim 2, wherein the mean value is determined as a weighted mean of the contact points determined immediately prior during a pre-determined time period, wherein older values for the contact point are weighted weaker than more recent values of the contact point.

13. The process according to claim 2, wherein the mean value is determined as a weighted mean of initially determined contact points, wherein older values for the contact point are weighted more weakly than values of the contact points lying closer in time to the actual value of the contact point.

14. The process according to claim 12, wherein the weighting falls off linearly.

15. The process according to claim 13, wherein the weighting falls off linearly.

16. The process according to claim 12, wherein the weighting falls off exponentially.

17. The process according to claim 13, wherein the weighting falls off exponentially.

18. The process according to claim 10, including adjusting the mean value to a current contact point only with a maximum value based on magnitude.

19. The process according to claim 13, including adjusting the mean value to a current contact point only with a maximum value based on magnitude.

20. The process according to claim 2, including calculating the mean value by means of a digital filter from a time sequence of adapted contact points.

21. The process according to claim 2, including maintaining the mean value within a driving cycle constant on a last plausible contact point from a preceding driving cycle.

22. The process according to claim 1, including detecting, via the monitoring module with the safety function, a non-plausible state of the clutch when a rate of change of the contact point exceeds a speed limit value.

23. A non-transitory computer program product comprising a computer program that features software means for carrying out a process for determining and monitoring a contact point of an automated clutch in a motor vehicle, wherein the motor vehicle features a control device, which process includes the steps of:
    determining the contact point by means of an adaptation strategy that is executed as a non-safety function, the control point describing a position of the clutch from where the clutch begins to transmit a definite torque; and
    executing a monitoring process of the determined contact point using a monitoring module as a safety function, wherein the safety function of the determined contact point is at ready disposal, and the safety function determines at least one band defining a range of values for the contact point, the at least one band depending upon initially determined contact points and/or a default time scale and/or a default tolerance and detects a non-plausible state of the clutch when the determined contact point lies outside of the at least one band.

24. An apparatus for determining and monitoring a contact point of an automated clutch, which is disposed in a motor vehicle, comprising:
   a control device in which the contact point is determined by an adaptation strategy executed as a non-safety function, the control point describing a position of the clutch from where the clutch begins to transmit a definite torque; and
   a monitoring module for monitoring the contact point as a safety function, wherein the safety function of the determined contact point is held readily available, and at least one band is determined defining a range of values for the contact point, the at least one band dependent upon at least one of pre-determined contact points, a default time scale, and a default tolerance, a non-plausible state of the clutch being detected when the determined contact point lies outside of the band.

* * * * *